United States Patent [19]

Kliem et al.

[11] Patent Number: 4,876,079
[45] Date of Patent: Oct. 24, 1989

[54] SEPARATION OF A MIXTURE OF SULFUR AND ALKALINE SOLUTION AND APPARATUS THEREFOR

[75] Inventors: Erhard Kliem, Eurasburg; Guenter Weber, Linden; Alfred Kunz, Grossdingharting, all of Fed. Rep. of Germany

[73] Assignee: Linde Aktiengesellschaft, Wiesbaden, Fed. Rep. of Germany

[21] Appl. No.: 201,382

[22] Filed: May 31, 1988

Related U.S. Application Data

[63] Continuation of Ser. No. 881,766, Jul. 3, 1986, abandoned.

[30] Foreign Application Priority Data

Jul. 3, 1985 [DE] Fed. Rep. of Germany ....... 3523846

[51] Int. Cl.$^4$ .................... B01D 17/00; C01B 17/027
[52] U.S. Cl. .................... 423/578 R; 23/293 S;
23/308 S; 210/114; 210/115; 210/536; 210/540;
210/773; 210/774; 210/800
[58] Field of Search ........................ 423/578 R, 578 A;
23/293 S, 308 S; 210/114, 115, 536, 540, 773, 774, 800

[56] References Cited

U.S. PATENT DOCUMENTS

| 2,767,848 | 10/1956 | Beckett | 210/800 |
| 2,829,774 | 4/1958 | Muller | 210/114 |
| 3,784,010 | 1/1974 | Barra et al. | 210/115 |
| 4,304,570 | 12/1981 | Kleeberg et al. | 23/308 S |

FOREIGN PATENT DOCUMENTS

| 2904845 | 2/1979 | Fed. Rep. of Germany | 23/308 S |
| 882549 | 11/1981 | U.S.S.R. | 210/773 |
| 846540 | 8/1960 | United Kingdom | 210/800 |

*Primary Examiner*—John Doll
*Assistant Examiner*—Jeffrey E. Russel
*Attorney, Agent, or Firm*—Millen, White & Zelano

[57] ABSTRACT

For the separation of sulfur from a sulfur/alkaline solution suspension, the suspension is heated to a temperature above the melting temperature of the sulfur and is introduced under pressure into a separating tank 1, containing a separating chamber 8, alkaline solution chamber, and sulfur chamber 12. From the separating tank, settled liquid sulfur is continuously withdrawn, on the one hand, via conduit 16 and alkaline solution is continuously withdrawn, on the other hand, via conduit 9. In order to provide a system having little susceptibility to trouble, the separating chamber and alkaline solution chamber are operated in the flooded mode, thereby avoiding the necessity for a steam blanket therein.

13 Claims, 3 Drawing Sheets

SEPARATION OF A MIXTURE OF SULFUR AND ALKALINE SOLUTION AND APPARATUS THEREFOR

This application is a continuation of application Ser. No. 881,766, filed July 3, 1986, now abandoned.

BACKGROUND OF THE INVENTION

1. Field of the Invention:

The invention relates to a process for the separation of sulfur from a sulfur/alkaline solution suspension, wherein the suspension is heated to a temperature above the melting temperature of sulfur and is conducted under pressure to a separating tank containing a separating chamber, alkaline solution chamber and sulfur chamber; from which tank there is continuously withdrawn, on the one hand, settled liquid sulfur and, on the other hand, alkaline solution; the invention further relates to apparatus and in particular to a separating tank suitable for performing the process.

2. Prior Art

German Pat. No. 2,904,845 discloses a process for the separation of a so-called Stretford alkaline solution from sulfur. In this conventional process, a steam blanket or cushion is maintained in each separating tank, above the suspension, in order to maintain the pressure under which the separating tank is held at the saturation pressure, while the alkaline solution scrubbing agent is removed via an overflow. The reference furthermore provides a separating tank for conducting the process, this tank comprising a separating chamber to which is connected, on the one hand, an alkaline solution chamber by way of an overflow weir and, on the other hand, a sulfur chamber by way of a continuous, immersed wall, the tank chambers being in communication with one another above the separating chamber, the alkaline solution chamber and the sulfur chamber, and being designed as a space for steam. A separating pressure control device is connected to this steam space. By saturation pressure is meant the vapor pressure of the suspension.

The aforedescribed process has the disadvantage that a specific steam blanket must be maintained at all times in order to keep the saturation pressure ambient in the separating chamber. As a consequence, there is a danger that effective separation of the sulfur/alkaline solution suspension is not ensured in case of unforeseen trouble during which a steam blanket is not provided.

SUMMARY OF THE INVENTION

An object of one aspect of the present invention is to provide a process of the type discussed hereinabove so that the aforementioned disadvantage of the conventional process is overcome and a system is provided that has little suceptibility to trouble.

An object of another aspect of this invention is to provide a separating tank for accomplishing the aforedescribed process.

Upon further study of the specification and appended claims, further objects and advantages of this invention will become apparent to those skilled in the art.

Accordingly, the invention comprises, in a process aspect involving the separation of sulfur from a sulfur-/alkaline solution suspension, wherein the suspension is heated to a temperature above the sulfur melting temperature and is conducted under pressure to a separating tank having a separating chamber, alkaline solution chamber and sulfur chamber, from which tank there is continuously withdrawn both a settled liquid sulfur stream and also an alkaline solution stream, the improvement comprising operating the separating chamber and the alkaline solution chamber in the flooded mode.

The invention further comprises, in an apparatus aspect, a separating tank for performing a process for the separation of sulfur from a sulfur/alkaline solution suspension wherein the suspension is heated to a temperature above the melting temperature of sulfur and is conducted under pressure to the separating tank, from which separating tank there is continuously withdrawn, on the one hand, settled liquid sulfur, and on the other hand, alkaline solution; the separating tank comprising separating and alkaline solution chambers as well as a sulfur chamber, feed means for feeding the sulfur/alkaline solution suspension to the separating chamber, withdrawal means for the alkaline solution, and discharge means for the liquid sulfur, the improvement wherein the sulfur chamber is substantially isolated by a partitioning unit from the remainder of the separating tank and is connected to the alkaline solution chamber by at least one "overflow" device to be described infra.

Heating of a sulfur/alkaline solution suspension has the effect that the sulfur changes from the solid state to the liquid state. Thereafter the liquid sulfur/alkaline solution mixture is separated in the separating tank, preferably by decantation. The lighter fraction (alkaline solution) gathers in the upper part, the heavier fraction (liquid sulfur) gathers in the bottom of the separating tank. The system is designed in such a way that the contact surface between the lye and liquid sulfur is always below the overflow border of an influx weir to the alkaline solution chamber and above the connection conduit to the sulfur chamber. This makes sure that only lye flows to the alkaline solution chamber and only liquid sulfur flows to the sulfur chamber. At the pressure in the entire system the static head of liquid in the separation chamber causes the overflow of liquid sulfur into the sulfur chamber. Centrifying or cyclone separating are not suitable alternatives to the inventive process.

During this step, the alkaline solution, being the lighter fraction having a lower density is discharged from the alkaline solution chamber in the upward, i.e., gravity opposing direction, so that the separating and alkaline solution chamber, without a gas/steam blanket, is always flooded. The liquid sulfur, being the heavier fraction with a higher density passes from a lower part of the separating tank into the adjoining sulfur chamber from which the liquid sulfur is continuously withdrawn.

Accordingly, the invention effectively utilizes the differing densities of the alkaline solution and sulfur phases, making it possible to withdraw alkaline solution from the separating tank at the top and to thereby operate the separating chamber and the alkaline solution chamber in the flooded mode, i.e., without the presence of a gas/steam blanket. Since the difference in densities is basically always present, it is also possible at all times to effect substantially complete separation of the feed suspension into the two phases of liquid sulfur and alkaline solution. Consequently, the process of this invention shows little susceptibility to disturbances. At smaller differences of the densities of the liquid phases the duration of the separation must be elongated. There is no signifcant influence of the temperature of the system to the separation. However, the temperature must be higher than the melting point of the sulfur, but not too high to avoid chemical side reactions. The temperature for the sulfur/lye separation should be about 130° to 135° C. The density of the liquid sulfur is 1.7947 at 130° C., and 1.7865 at 140° C. The density of the lye is about 1.05 to 1.3 kg/l.

An essential prerequisite for performing the process of this invention resides in bringing the suspension to a temperature above the melting temperature of the sulfur, e.g., about 119° C., preferably about 130° to 135° C.. In a further embodiment of this invention, heating of the suspension and, respectively, liquefaction of the sulfur is carried out with the aid of steam from a steam injector, the injector being located upstream of the separating tank. In order to keep the sulfur liquid and suitable for pumping, heating units are additionally arranged in all chambers of the separating tank, serving to maintain the temperature at all times above the sulfur melting temperature. This is particularly important to offset any breakdown in the steam injector.

It is possible in many instances for the separated alkaline solution to still contain a certain proportion e.g., about 0 to 90 wt%, of sulfur and still be useful for scrubbing purposes. Thus, it is not necessary to remove all the sulfur from the entire alkaline solution. It is therefore, advantageous if the sulfur is separated only from a partial stream, e.g., about 0 to 90 wt%, of the sulfur/alkaline solution suspension. The only demand is, that the quantity is separated which corresponds to the yield of production.

This holds true, for example, in the aforementioned case of the so-called Stretford scrubbing lye, or any other conventional scrubbing liquor utilized during the course of gas processing or gas purification, where sulfur is being formed.

As described above, the liquid sulfur passes through an "overflow" device, more particularly one or more parallel-arranged pipes, into the sulfur chamber from which the sulfur is continuously removed via a liquid level control unit. In the sulfur chamber, any gas/steam blanket is suitably maintained above the liquid and maintains the pressure in the sulfur chamber at a value corresponding to the saturation pressure in the separating and alkaline solution chambers. The known process with the gas/steam blanket in the separation and lye chamber has the disadvantage, that the blanket is always to be maintained to keep the saturation pressure in the separation chamber. There is the danger that at operating fault no such blanket can be built up and that the separation of the lye/sulfur suspension is not assured.

With the inventive process the pressure of the gas/steam blanket in the sulfur chamber is maintained via an independent pressure maintaining device with an inert gas. The pressure is always higher than the saturation pressure. The gas/steam blanket is independent of the temperature of the system.

The gas/steam blanket utilized in the sulfur chamber consists essentially of a wide variety of inert gases and-/or steam and/or alkaline solution vapors, as well as the gases dissolved in the alkaline solution. This mode of operation offers the advantage that the alkaline solution, or other impurities of lower specific gravity which are not separated will accumulate on the surface of the liquid sulfur and can be continuously and effectively removed therefrom.

The invention also involves a separating tank for performing the process, having a separating and alkaline solution chamber, as well as a sulfur chamber, a feed means for the sulfur/alkaline solution suspension, a withdrawal means for the alkaline solution, and a discharge means for the liquid sulfur. This separating tank is characterized in that the sulfur chamber is substantially isolated from the remainder of the separating tank by means of a partitioning unit and is connected to the alkaline solution chamber by at least one "overflow" device. (The term "overflow" in the context of this invention has a different connotation for a flooded case than in the usual case since it is excess liquid sulphur which is removed through a port completely immersed in a liquid sulphur.) According to this invention, the sulfur chamber is thus separated from the alkaline solution chamber, in particular, for example by means of a wall, over the entire diameter of the separating tank.

According to a further embodiment of the separating tank, an influx weir or baffle is positioned in the tank proximate its entrance, i.e., the entrance for the suspension. This measure has the effect that the separating chamber is buffered, i.e., thereby removing turbulence at the feed point of any violent turbulence in the entering suspension, which could otherwise make separation into the alkaline solution fraction and the liquid sulfur fraction difficult. Moreover, a rough separation into the two aforementioned fractions immediately occurs by virtue of the flux weir.

Preferably, the alkaline solution chamber is connected to a pressure maintaining device.*) This pressure maintaining device ensures the removal of always only such an amount of alkaline solution that, on the one hand, the separating and alkaline solution chambers are always flooded and, on the other hand, the saturation pressure remains constant in the separating tank.
*) The pressure is always higher than saturation pressure.

Alternatively, the alkaline solution chamber can also be controlled by a phase interface regulating device which also has the effect that the separating and alkaline solution chamber is always flooded.

In accordance with a further embodiment, a steam injector is disposed in the feed conduit for the suspension, this injector effecting heating of the suspension and thus liquefaction of the sulfur, as well as contributing toward transport of the sulfur/alkaline solution suspension into the separating tank which is under saturation pressure. For this purpose, a pump is additionally arranged in the feed conduit.

In order to maintain the temperature at all times above the sulfur melting temperature, each chamber is moreover equipped with a heating unit, for example a steam heater.

The apparatus for and process of practicing this invention is suitable for any sulfur separation from any desired alkaline solution solution, or for that matter for the separation of any system having two liquid phases of differing densities.

BRIEF DESCRIPTION OF THE DRAWINGS

This invention will be described in greater detail below, with reference to preferred embodiments schematically illustrated in three figures wherein.

DETAILED DESCRIPTION OF FIGURES

Figure 1:
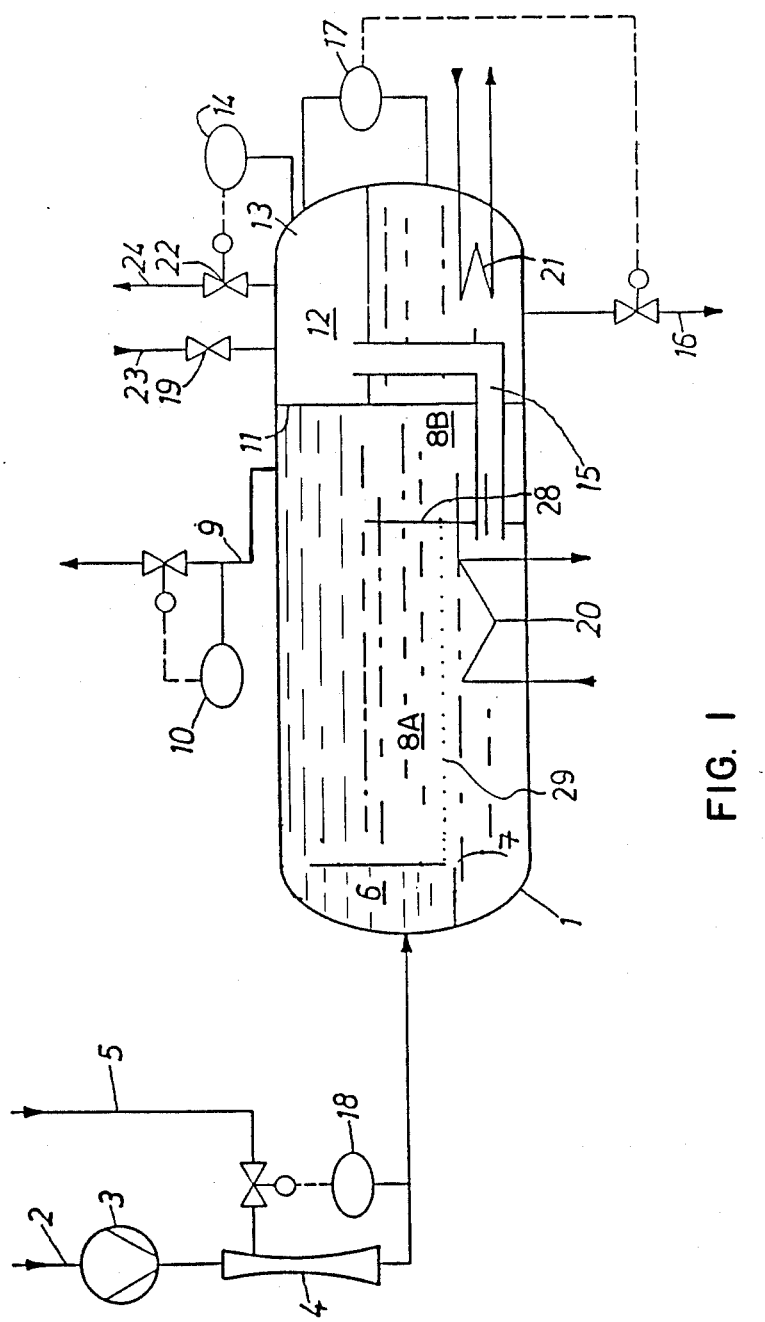
FIG. 1 shows a system embodying horizontal separating tank with overflow pipe.

According to FIG. 1, a horizontal separating tank 1 is supplied, via conduit 2, with about 5,000 kg/h of a sulfur/alkaline solution suspension at a temperature of about 30° C. and under a pressure of about 0.2 bar. This suspension contains about 1,000 kg/h of sulfur. A pump 3 and a steam injector 4 are arranged in conduit 2. The pump 3 conveys the suspension to a pressure of about 3.0 bar and, in the steam injector, the suspension is heated by means of superheated steam (50 kmol/h) introduced via conduit 5 to a temperature, with the use of a temperature controller 18, above the melting temperature of the sulfur (119° C.), i.e., for example, about 130° C., and is then conveyed into the separating tank 1.

The suspension is met by an influx weir or baffle 6, wherein a portion of the sulfur, liquefied from the heating in the steam injector, drops down and passes via a port 7 into the lower zone of the separating tank. The liquid sulfur/alkaline solution mixture passes both above and below the influx weir into a separating chamber 8A.

After an adequate residence time, i.e., the time which is necessary for the lye/sulfur suspension to separate because of the different densities, e.g., 1 to 60 minutes, preferably 2 to 20 minutes, separation takes place in the separating chamber 8 forming an alkaline solution fraction and a liquid sulfur fraction. The light fraction (4,000 kg/h of alkaline solution) having the lower density, passes over an overflow weir 28 from the separating chamber 8A into the alkaline solution chamber 8B and is continuously discharged in the upward direction via conduit 9 and saturation pressure maintaining device 10 in such a way that the separating and alkaline solution chambers, without a gas/steam blanket, are flooded at all times. The withdrawn alkaline solution contains less than 1 kg/h of sulfur. Line 29 designates the interface between the liquid phases in the separation chamber. The overflow weir 28 is not fundamentally necessary for the functioning of the separation apparatus.

The liquid sulfur (heavy fraction) having the higher density passes in the lower portion of the separating tank, via an "overflow" pipe 15, into a sulfur chamber 12 which is segregated by means of a wall 11; liquid sulfur being continuously withdrawn in an amount of 1,000 kg/h from this sulfur chamber via conduit 16, the flow monitored by a level regulating means 17.

By way of manual control valve 19 and regulating valve 22, $N_2$ or another inert gas is fed into the sulfur chamber via conduit 23 and, respectively, discharged via conduit 24, and thus an inert gas blanket 13 is built up above the liquid sulfur, the pressure of which is monitored and maintained by means of a pressure maintaining device 14 at a value corresponding to the saturation pressure, measured at 10, of the separating and alkaline solution chambers 8. The pressure at 14 remains constant in the steady state condition.

In order to keep the temperature in separating tank 1 always above the melting temperature of the sulfur, heating units 20 and 21 are provided, which are operated with steam.

Figure 2:
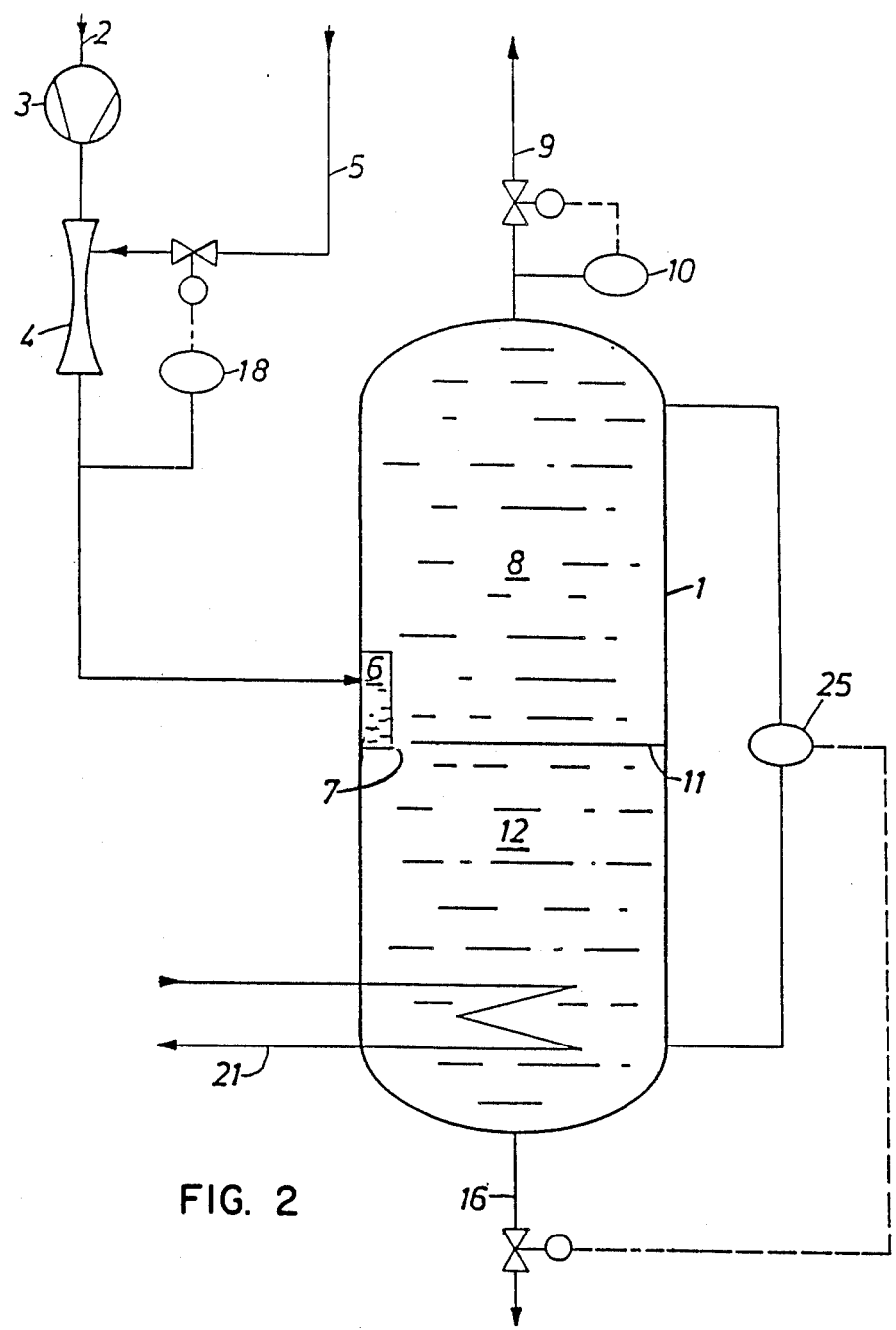
FIG. 2 shows a system embodying a vertical separating tank.

In the embodiment set forth in FIG. 2, identical parts carry the same reference numerals.

As contrasted to the separating tank of FIG. 1, the separating tank in FIG. 2 is positioned vertically. Inside the separating tank, the liquid sulfur/alkaline solution mixture is separated, after an adequate residence time, by means of decanting, i.e., the alkaline solution, as the light fraction having the lower density is continuously withdrawn in the upward direction via the saturation pressure maintaining device 10 and conduit 9, so that the separating tank without a gas/steam cushion is always flooded.

The liquid sulfur, as the heavy fraction with the higher density, passes into the lower portion of the separating tank. In order to maintain a constant liquid sulfur level, a conventional interface regulator 25 are provided, by way of which the liquid sulfur is continuously removed in the downward direction by way of conduit 16.

An influx weir 6 is arranged at the entrance of the sulfur/alkaline solution suspension into the separating tank 1. In order to keep the sulfur liquid, a steam heater 21 is installed, which maintains the temperature always above the sulfur melting temperature.

Figure 3:
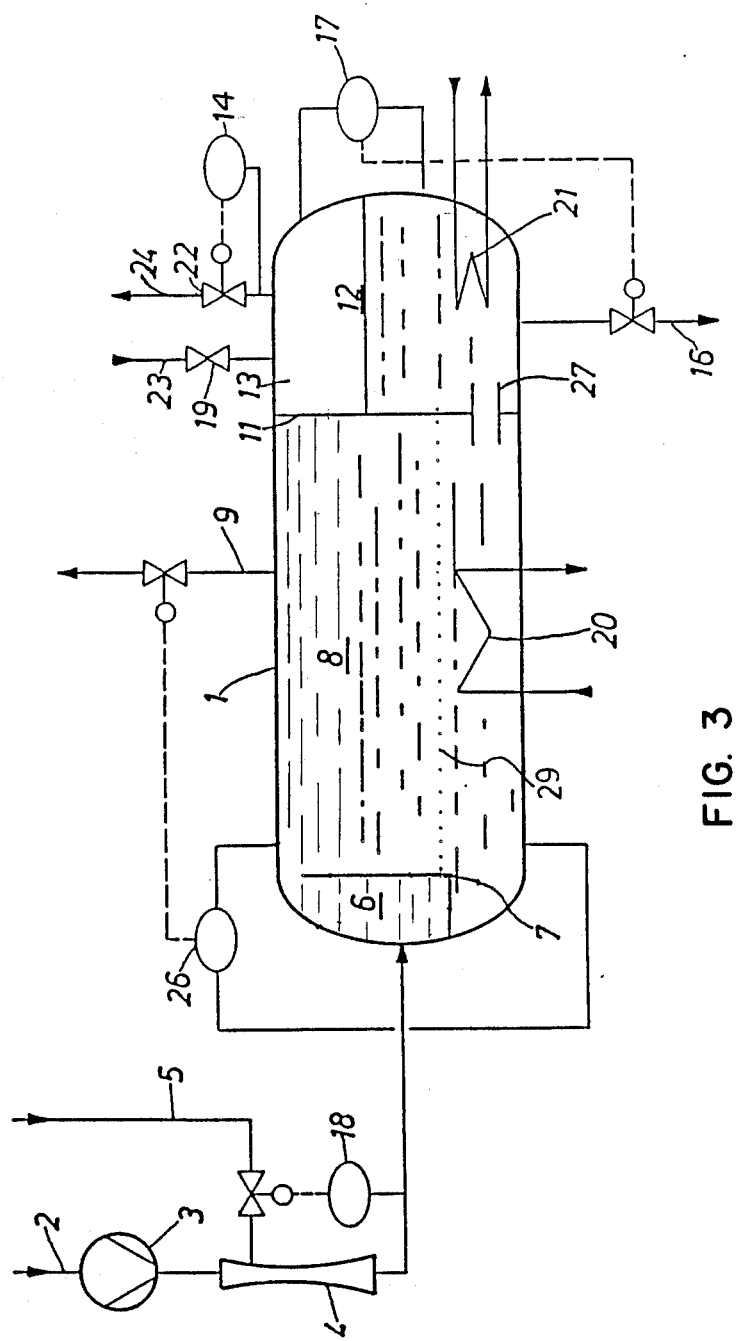
FIG. 3 shows a system embodying a horizontal separating tank having a throughflow pipe.

The separating tank set forth in FIG. 3 essentially corresponds to that of FIG. 1. Here too, the liquid sulfur/alkaline solution mixture is separated by decanting after an adequate residence time. The alkaline solution, being the light fraction with the lower density, is removed continuously in the upward direction via conduit 9 from the separating and alkaline solution chamber. This is regulated by interface layer control means 26 maintained at saturation pressure, so that the separating and alkaline solution chamber, without a gas/steam blanket, is always flooded.

The liquid sulfur, as the fraction with the higher density, passes from the lower portion of the separating tank via a throughflow pipe 27 into the sulfur chamber, from which the sulfur is continuously withdrawn by regulation of a level control means 17. The arrangement otherwise corresponds to that of FIG. 1.

In the embodiments of both FIGS. 1 and 3, the liquid level of the sulfur phase in the sulfur chamber is higher than the liquid level of the sulfur phase in the separating chamber and combined separating and alkaline solution chamber respectively.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the separation of sulfur from a sulfur/alkaline solution suspension, wherein the suspension is heated to a temperature above the sulfur melting temperature and is conducted under pressure to a separating tank having a separator chamber, alkaline solution chamber and sulfur chamber, from which tank there is continuously withdrawn both a settled liquid sulfur stream and also an alkaline solution stream, the improvement comprising operating the separating chamber and the alkaline solution chamber in a flooded mode at a pressure above the saturation pressure and maintaining in the sulfur chamber a gas blanket having a pressure in the sulfur chamber of about the same pressure as in the separating and alkaline solution chambers, said gas blanket being an inert gas or steam.

2. A process according to claim 1 wherein the sulfur/alkaline solution suspension is heated by steam upstream from the separating tank.

3. A process according to claim 1 wherein the sulfur is separated from a partial stream of the sulfur/alkaline solution suspension.

4. A process according to claim 1, wherein the temperature of the suspension is about 130°–135° C.

5. A process according to claim 1, wherein the temperatures of the separation chamber, alkaline solution chamber and sulfur chamber are maintained above the sulfur melting temperature.

6. A process according to claim 1, wherein the pressure in the sulfur chamber is maintained by an independent pressure maintenance device.

7. A process according to claim 1 wherein the gas blanket is an inert gas.

8. A process according to claim 1 wherein the separating tank is horizontal and the sulfur in the sulfur chamber has a higher liquid level than the sulfur liquid level in the separating chamber.

9. A process according to claim 1 wherein the separating tank is horizontal and the sulfur in the sulfur chamber has a higher liquid level than the sulfur level in the separating and alkaline solution chamber.

10. A process according to claim 8 wherein the gas blanket is an inert gas.

11. A process according to claim 9 wherein the gas blanket is an inert gas.

12. In a process for the separation of sulfur from a sulfur/alkaline solution suspension, wherein the suspension is heated to a temperature above the sulfur melting temperature and is conducted under pressure to a separating tank having a separation and alkaline solution chamber and a sulfur chamber, from which tank there is continuously withdrawn both a settled liquid sulfur stream and also an alkaline solution stream, the improvement comprising operating the separation and alkaline solution chamber in a flooded mode at a pressure above the saturation pressure and maintaining in the sulfur chamber a gas blanket having a pressure in the sulfur chamber of about the same pressure as in the separating and alkaline solution chamber, said gas blanket being an inert gas or steam.

13. A process according to claim 12 wherein the gas blanket is an inert gas.

* * * * *